(12) United States Patent
Nashbar

(10) Patent No.: US 9,772,808 B1
(45) Date of Patent: Sep. 26, 2017

(54) SYSTEM AND METHOD FOR DOCUMENT DELIVERY

(71) Applicant: Eric Nashbar, Sarasota, FL (US)

(72) Inventor: Eric Nashbar, Sarasota, FL (US)

( * ) Notice: Subject to any disclaimer, the term of this patent is extended or adjusted under 35 U.S.C. 154(b) by 0 days.

(21) Appl. No.: 14/093,415

(22) Filed: Nov. 30, 2013

Related U.S. Application Data

(60) Provisional application No. 61/731,477, filed on Nov. 29, 2012.

(51) Int. Cl.
*G06K 15/00* (2006.01)
*G06F 3/12* (2006.01)
*H04N 1/00* (2006.01)
*H04N 1/44* (2006.01)
*G06Q 20/08* (2012.01)
*G06Q 20/40* (2012.01)

(52) U.S. Cl.
CPC .......... *G06F 3/1238* (2013.01); *G06F 3/1222* (2013.01); *G06F 3/1287* (2013.01); *G06F 3/1293* (2013.01); *G06K 15/4095* (2013.01); *G06Q 20/0855* (2013.01); *G06Q 20/40* (2013.01); *H04N 1/00347* (2013.01); *H04N 1/00854* (2013.01); *H04N 1/00925* (2013.01); *H04N 1/4406* (2013.01)

(58) Field of Classification Search
CPC .... G06F 3/1238; G06F 3/1293; G06F 3/1222; G06F 3/1287; G06Q 20/0855; G06Q 20/40; H04N 1/00854; H04N 1/00347; H04N 1/4406; H04N 1/00925; G06K 15/4095
See application file for complete search history.

(56) References Cited

U.S. PATENT DOCUMENTS

| | | | | |
|---|---|---|---|---|
| 5,794,210 A | * | 8/1998 | Goldhaber | G06Q 30/02 705/14.69 |
| 6,826,547 B1 | * | 11/2004 | Silverbrook | B41J 2/17513 347/1 |
| 2006/0229940 A1 | * | 10/2006 | Grossman | G06Q 10/08 705/14.31 |
| 2008/0082417 A1 | * | 4/2008 | Publicover | G06Q 30/02 705/14.23 |
| 2008/0319845 A1 | * | 12/2008 | Adkins | G06Q 30/02 705/14.27 |
| 2009/0016507 A1 | * | 1/2009 | Altberg | G06Q 30/02 379/114.01 |
| 2009/0254971 A1 | * | 10/2009 | Herz | G06Q 10/10 726/1 |
| 2009/0319371 A1 | * | 12/2009 | Young | G06Q 30/0256 705/14.54 |
| 2010/0241507 A1 | * | 9/2010 | Quinn | G06Q 30/02 705/14.42 |
| 2011/0029385 A1 | * | 2/2011 | Engel | G06Q 30/02 705/14.53 |

(Continued)

*Primary Examiner* — Benjamin O Dulaney
(74) *Attorney, Agent, or Firm* — Kafantaris Law Offices; Theo Kafantaris

(57) ABSTRACT

The direct marketing system and method is disclosed that receives information from two parties, referred to as the sending party and the receiving party, and delivers a message or advertisement between the two. The message is then immediately printed on the receiving party's printer, and a small fee is paid by the sending party. A portion of this fee is sent to the receiving party as reimbursement for paper costs, ink costs, and printer maintenance.

17 Claims, 5 Drawing Sheets

(56) References Cited

U.S. PATENT DOCUMENTS

| | | | | |
|---|---|---|---|---|
| 2011/0087531 A1* | 4/2011 | Winters | ................. | G06Q 20/10 |
| | | | | 705/14.17 |
| 2011/0191183 A1* | 8/2011 | Jones | ................. | G06Q 30/0257 |
| | | | | 705/14.55 |
| 2012/0190386 A1* | 7/2012 | Anderson | .............. | G01C 15/04 |
| | | | | 455/456.3 |
| 2013/0073391 A1* | 3/2013 | Young | ................. | G06Q 30/0247 |
| | | | | 705/14.54 |
| 2013/0080242 A1* | 3/2013 | Alhadeff | ............ | G06Q 30/0217 |
| | | | | 705/14.39 |
| 2013/0139239 A1* | 5/2013 | Jillings | ................... | H04L 63/12 |
| | | | | 726/7 |
| 2014/0089067 A1* | 3/2014 | Filev | ................. | G06Q 30/0207 |
| | | | | 705/14.19 |

* cited by examiner

SYSTEM AND METHOD FOR DOCUMENT DELIVERY

CROSS-REFERENCE TO RELATED APPLICATIONS

This application claims the benefit of U.S. Provisional Patent Application No. 61/731,477, filed on Nov. 29, 2013, and incorporated herein by reference.

STATEMENT REGARDING FEDERALLY SPONSORED RESEARCH AND DEVELOPMENT

Not Applicable.

FIELD OF THE INVENTION

This invention relates generally to document delivery, and more particularly, to a system and method for directly sending documents, email, or faxes to a recipients printer rather than their physical mailbox, post office box, or fax machine.

DISCUSSION OF RELATED ART

Mail, or post, can generally be described as a system for transporting letters and other tangible objects to an individual or physical address. Mailings are often enclosed in envelopes or other packaging to protect and maintain the privacy of their contents during delivery. Typically, a post office or other mail delivery service is used to transport the mailings between parties for a fee. The fee, or postage, is traditionally paid by the sending party, although the receiving party may reimburse the sending party for larger packages.

A facsimile, or fax, is an electronic transmission of scanned printed material (text and/or images) over a telephone line. Traditionally, the sending party will scan or otherwise prepare a digital document, initiate a telephonic connection, and transfer the document to a receiving fax machine for automatic printing. In many respects, a fax shares many characteristics of a traditional mailing, with the added benefit of quick delivery and lower overall costs. The costs, however, are shifted to the recipient, as a dedicated line must be established, a fax machine must be installed and maintained, and all printed material will inherently incur a cost.

Electronic mail, or email, can generally be described as an electronic transmission of a digital message between one or more recipients over the internet. Traditionally, the sending party will prepare an email using a computer or other electronic device and direct the message to one or more recipients, each having a unique email address. Recipients receive emails almost instantly, but unlike mail or fax, the messages remain digital unless printed by the recipient. As such, the costs of emails are largely negligible for both the sending and receiving party.

Direct marketing can generally be described as an advertisement which is communicated directly to a consumer. Direct mailing, a derivative of direct marketing, can generally be described as the delivery of an advertisement to a recipient through postal mail. Direct faxing and direct emailing share the same characteristics as direct mailing, albeit through a fax machine or computer. Advertisements include coupons, credit card applications, circulars, catalogs, and other types of commercial merchandising material.

Direct mailing, direct faxing, and direct emailing have proven to be extremely effective, stemming an entire direct marketing industry and representing a significant and growing amount of the total volume of postal mail and fax transmission. Advertisers are encouraged to utilize direct mail by qualifying for bulk rates, which are lower than traditional postage fees, but require large quantities of matching documents. There is even more incentive to utilize direct fax, where the costs are already shifted to the consumer. The incentive is greatest with direct emailing, where neither party incurs a substantial cost. Direct marketing is often described as spam or junk mail, as a significant portion is discarded without being opened or read.

Direct marketing through mail, fax, and email has become incredibly widespread, but it is not without serious drawbacks. Direct mailing is expensive, limited to delivery schedules, and generates an incredible amount of waste, raising great concern for its negative environmental impact. Direct faxing can frustrate consumers who pay for each unwanted advertisement they receive, stemming FCC fax advertisement rules and restrictions. Direct emailing is so widespread that many users spend most of their email time filtering through unwanted spam. Furthermore, end users become increasingly frustrated as the industry grows and their exposure to direct marketing increases. Therefore, a need exists for a direct marketing system which is effective, has a low cost, is approved by recipients, and has a low environmental impact. The present invention satisfies these needs.

SUMMARY OF THE INVENTION

The present invention will provide a direct marketing system which is effective, has a low cost, is approved by recipients, and has a low environmental impact. This is accomplished by compelling recipients to receive advertisements through incentives. More specifically, the present invention will send advertisements to recipients for local printing and will reimburse them for the costs of printing so long as the advertisement is actually printed, providing a shared cost scheme that is still effective.

The present invention implements several methods to perform the above tasks, including: Physical Address Sending, Fax Sending, Social Media Printing, Direct Email printing, Shopping Cart Abandonment, P2P Printing, API Printing and Search Sending. Each method receives information from two parties, referred to as the sending party and the receiving party, and delivers a message or advertisement between the two. The message is then immediately printed on the receiving party's printer, and a small fee is paid by the sending party. A portion of this fee is sent to the receiving party as reimbursement for paper costs, ink costs, and printer maintenance.

Physical Address Sending offers an alternative to direct mailing campaigns, allowing messages to be delivered directly to the printer of the receiving party, instead of their postal mailbox. Fax Sending offers an alternative to using a facsimile machine and dedicated line, while giving more control to the receiving party over which faxes are printed. Social Media Printing offers a method of sending a message directly to the printers of selected social media connections. Direct Email Printing offers the services of a typical electronic mail system, with the added step of printing out the transmitted message at the receiving party's printer. Shopping Cart Abandonment will deliver a product advertisement when a user includes items in a shopping cart, but does not follow through with their purchase. P2P Printing offers the receiving party the ability to share their printer across a network, with the option of charging the sending party for each message delivered. API Printing permits third parties to interface with their present systems. Search Sending offers advertisers the ability to automatically distribute a message to the printers of a particular subset of users who search for certain key terms online.

Current pricing is estimated at approximately $0.10 per page sent, while the receiving party is reimbursed approximately $0.06 per page. These price points reflect considerable savings when compared to either direct mail or direct fax campaigns. With almost 100 billion pieces of mail delivered annually in the USA to houses with both internet access and a printer, even a small fraction (10%) of this market share would lead to over a billion dollars in revenue per year.

The value of the proposed invention will continue to rise with the increase in postage cost, environmental concerns from paper waste, and the carbon footprint of transportation. Furthermore, the present invention is not restricted by delivery times or delivery schedules, provides an attractive price point for both the sending and receiving parties, eliminates the requirement of a fax machine with dedicated phone line, decreases the environmental impact and increases the effectiveness of the advertisements as a whole. Lastly, the dramatic increase of homes with Internet access and a computer with an attached printer will increase end-user exposure and ensure the longevity of the present invention.

These and other objectives of the present invention will become obvious to those of ordinary skill in the art after reading the following detailed description of the preferred embodiments. It is to be understood that the foregoing general description and the following detailed description are exemplary, and are intended to provide further explanation of the invention as claimed.

DETAILED DESCRIPTION OF THE PREFERRED EMBODIMENT

Illustrative embodiments of the invention are described below. The following explanation provides specific details for a thorough understanding of and enabling description for these embodiments. One skilled in the art will understand that the invention may be practiced without such details. In other instances, well-known structures and functions have not been shown or described in detail to avoid unnecessarily obscuring the description of the embodiments.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list.

Figure 1:
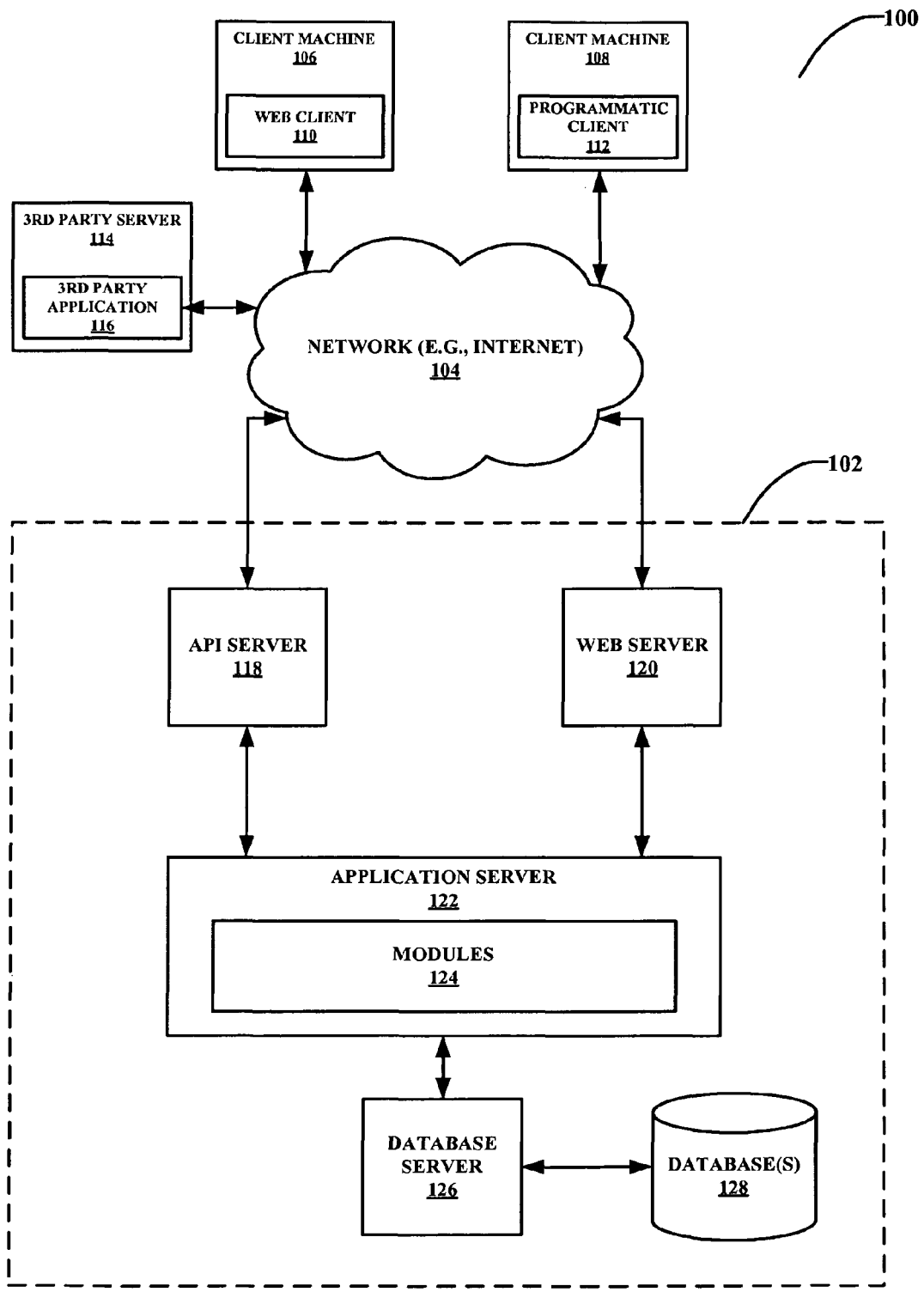
FIG. 1 is a diagram schematically illustrating a network wherein the server and client machines are connected.
Figure 2:
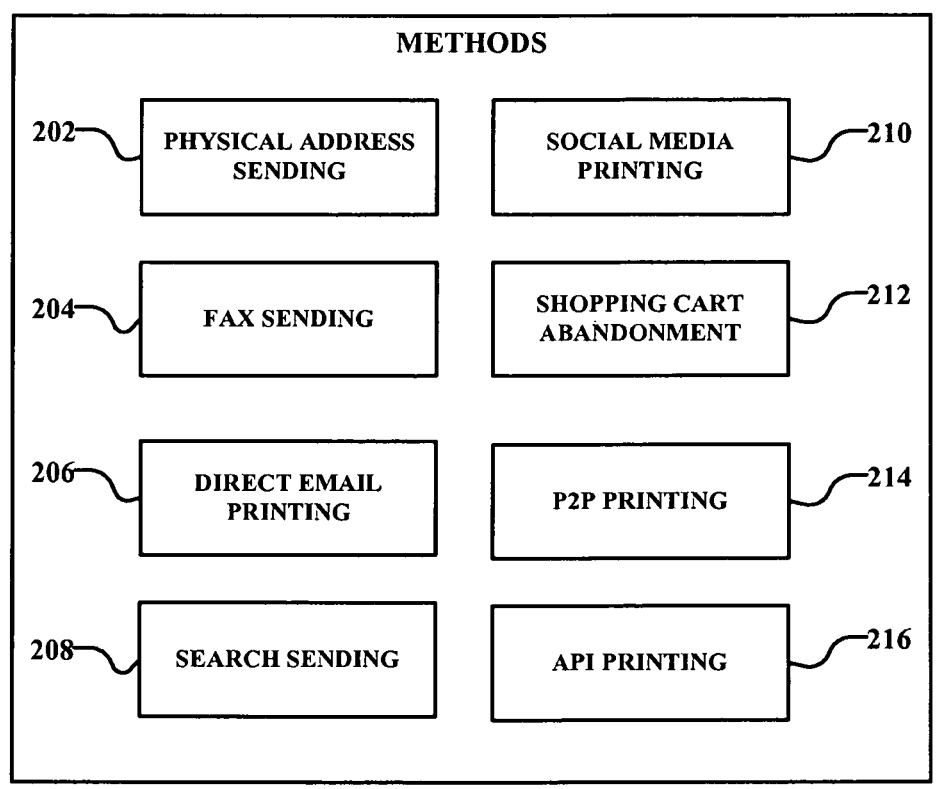
FIG. 2 is a diagram schematically illustrating the methods of the direct marketing system and method.
Figure 3:
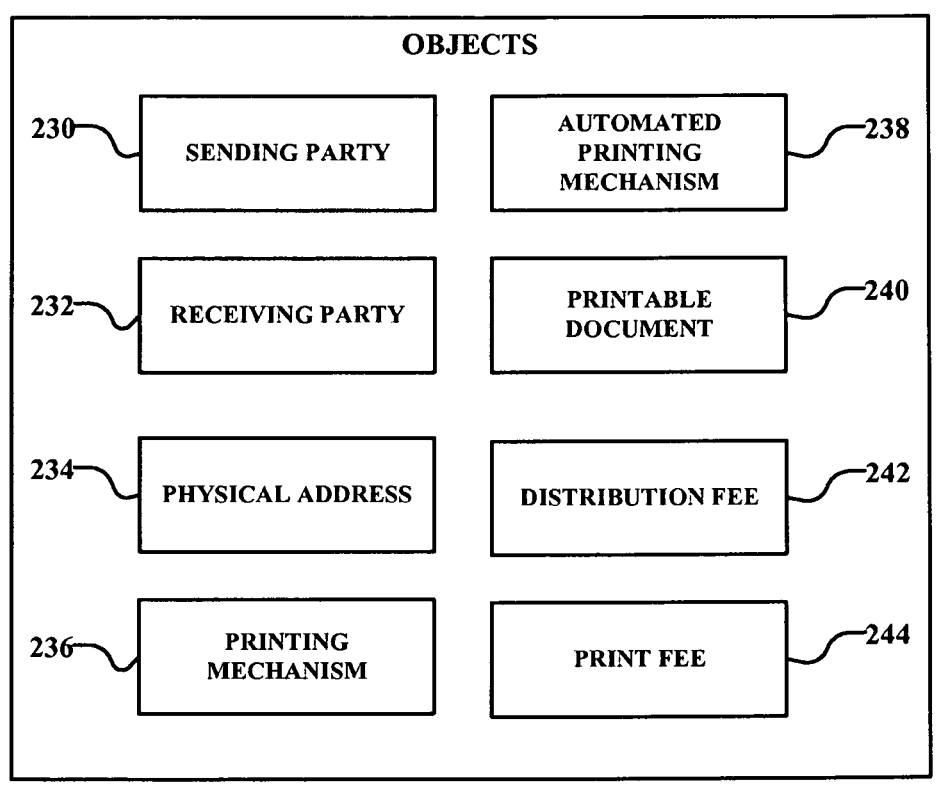
FIG. 3 is a diagram schematically illustrating methods of the direct marketing system and method.
Figure 4:
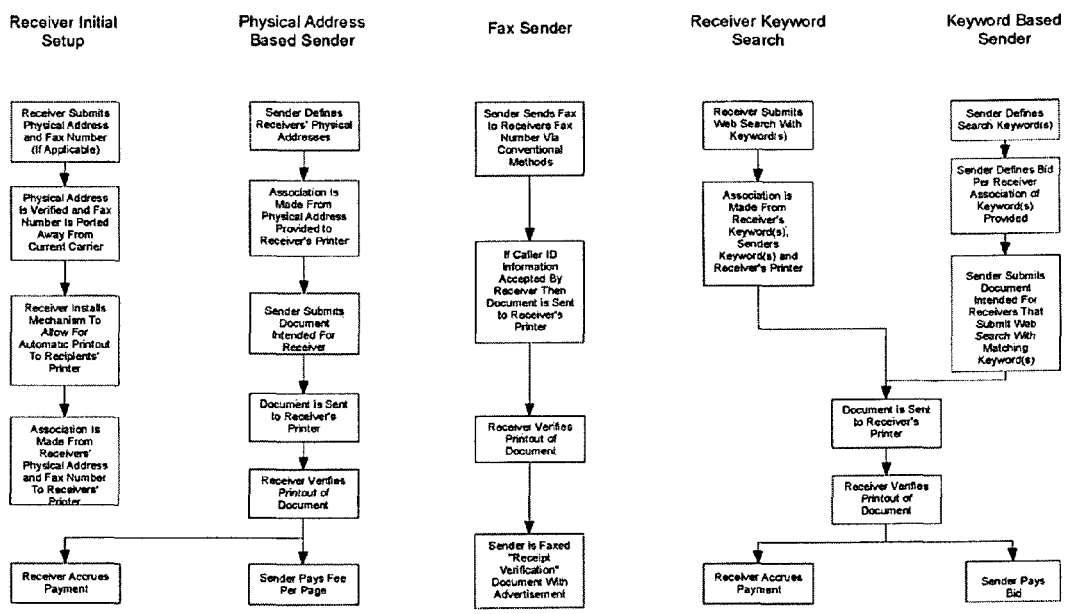
FIG. 4 is a diagram schematically illustrating the direct marketing system and method.
Figure 5:
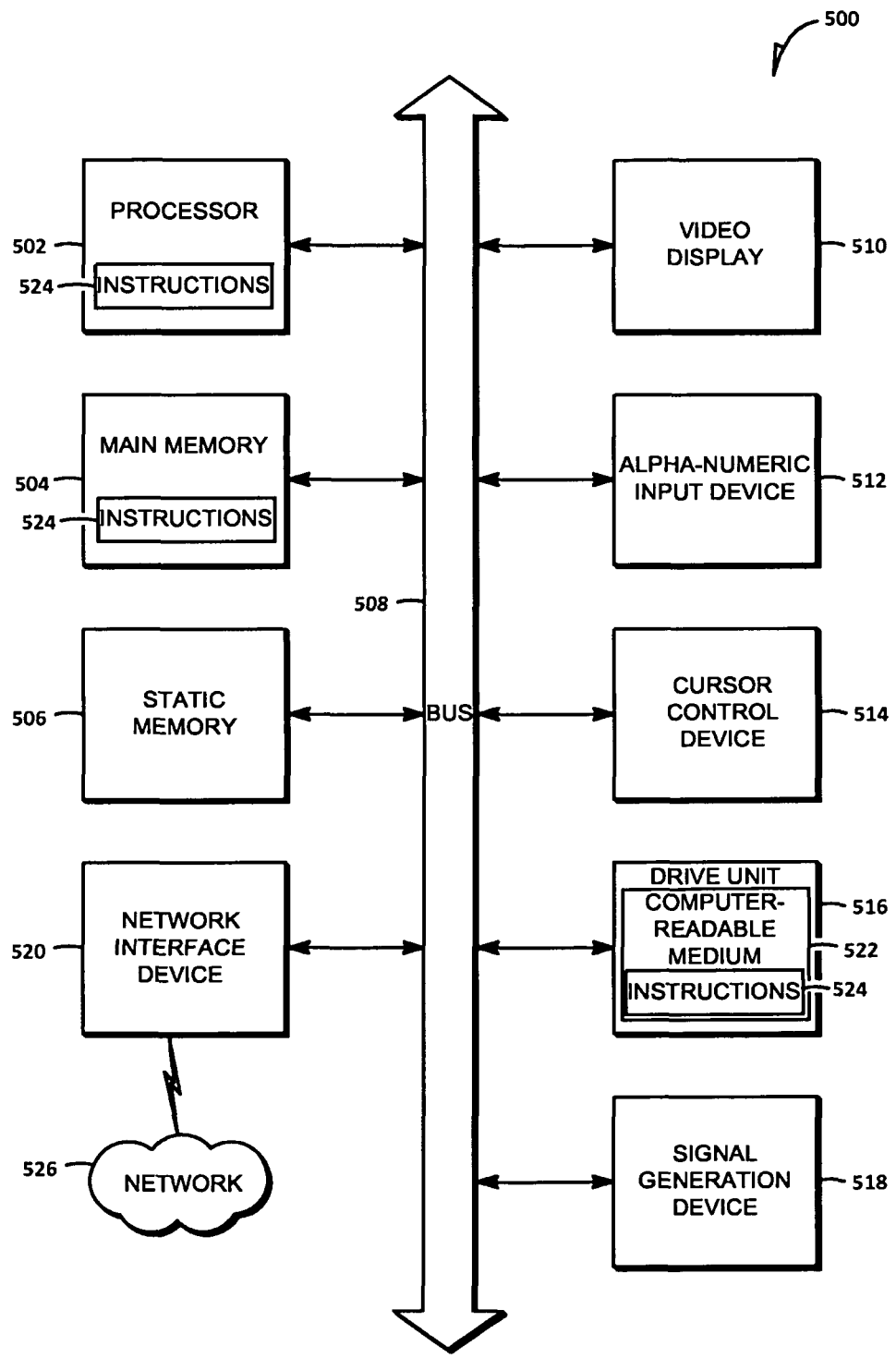
FIG. 5 is a flowchart illustrating the user interface of the direct marketing system and method.

FIG. 1 depicts a block diagram of a computer system 100 suitable for implementing aspects of the present invention. As shown in FIG. 1, computer system 100 includes the present invention 102, which interconnects major subsystems such as an API server 118, web server 120, application server 122, and database server 126 having a non-transitory storage medium 522. The application server 122 consists of several modules 124, and a database 128 exists on the database server 126. The present invention 102 connects to client machines 106 and 108, as well as 3rd party servers 114, through a network 104. Web clients 110 and programmatic clients 112 exist on the client machines 106 and 108, respectively, and 3rd party applications 116 that exist on the third party server 114.

The present invention is a system comprised of a plurality of methods: Physical Address Sending 202, Fax Sending 204, Direct Email Printing 206, Search Sending 208, Social Media Printing 210, Shopping Cart Abandonment 212, P2P Printing 214, and API printing 216. Each method receives information from two parties, referred to as the sending party 230 and the receiving party 232, and delivers a printable document 240, message or advertisement between the two. The receiving party 232 will have a client machine 106 electronically attached to a printing mechanism 236.

With respect to the Physical Address Sending method 202, the present invention will first receive a physical address 234 from a receiving party 232. The physical address 234 must be verified to ensure that the party receiving the printable documents 240 is indeed the intended party. In the preferred embodiment, a plurality of personal questions will be generated from the receiving party's 232 credit reports. Furthermore, a plurality of personal question answers to these personal questions will also be generated. The questions will be sent to the receiving party's 232 physical address 234, to which they will submit answers. The received answers are compared to the generated personal question answers and the physical address is verified if the answers are the same.

In an alternative embodiment, the physical address 234 of the receiving party 232 is verified through a unique identification code corresponding to the physical address 232 claimed by the recipient, which is cross-referenced against the USPS address database. The receiving party 232 will first initiate the request, after which the unique code is generated. The unique code will be sent to the received physical address 234. After receipt, the receiving party 232 will submit a return code. The codes will be compared and, if equal, the physical address 234 will be verified.

Once the physical address 234 is verified, the receiving party 232 will then configure and install an automatic printing mechanism 238 onto their client machine 106, which ensures the sending party's 230 printable document 240 is received and printed at the receiving party's 232 printing mechanism 236. In the preferred embodiment, the automated printing mechanism 238 comprises software which is installed on the client machine 106. In an alternative embodiment, the automated printing mechanism 238 is a standalone unit which is electronically attached to the client machine 106 and printing mechanism 236. The automated printing mechanism 238 further comprises a means of confirming that the printable document 240 has actually been printed. In the preferred embodiment, this is performed by accessing the printer driver and receiving a confirmation of a successful print. Alternatively, the receiving party 232 may simply sent a response confirming that the printable document 240 has been printed successfully.

After the initial set up is complete for the Physical Address Sending method 202, the sending party 230 is given the opportunity to access the receiving party's 232 printing mechanism 236 to send out their desired printable document 240. The sending party 230 will submit a printable document 240, which is then sent to the automated printing mechanism 238. If printing is confirmed, the sending party 230 is charged a distribution fee 242. A print fee 244 is also distributed to the receiving party 232, the print fee 244 being a portion of the distribution fee 242. This print fee 244 is intended to cover the cost of printing and provide an incentive to use the present invention. The fees 242,244 are only charged when a printable document 240 is delivered, which is confirmed by the automated printing mechanism 238. The physical address 234, printable document 240, distribution fee 242, print fee 244, and confirmation are all stored on the non-transitory storage medium 544. Furthermore, receiving parties 232 can select which sending parties 230 may use this method via the Opt-Out mechanism described below.

With respect to the Fax Sending method 204, the receiving party 232 allows a currently active fax line to have its messages redirected to their client machine 106. Alternatively, a new fax line can be created which directly accesses the receiving party's 232 printing mechanism 236 instead of an actual facsimile. All of the current capabilities of sending and receiving faxes can be replicated through this system, while increasing privacy options as well as lowering cost for the receiving party 232.

In an alternative embodiment, a peripheral device can be connected to a user's fax machine to enable them to send faxes through the Fax Sending method 204. This ensures ease of use for the sending party 230, while still maintaining the lowered cost for the receiving party 232. If a sending party 230 delivers a fax message to another fax machine which is not tied to a user of the current system, an invitation to sign up is delivered after the initial message, at no charge.

With respect to the Social Media Printing method 210, users are linked through social media accounts such a Facebook, LinkedIn, etc. The sending party 230 can select particular contacts, or groups of contacts, create a list, and transmit a printable document 240 directly to the contacts' printing mechanisms 236. Sending and receiving users 230, 232 must have a social media account connection in order to transmit these printable documents 240. If such a connection is not found, the Physical Address Sending method 202 can be used to obtain the same results. The receiving party 232 can choose to have these printable documents 240 delivered at no cost to sending party 230. Receiving parties 232 can select which sending parties 230 may use this method via the Opt-Out mechanism described below.

With respect to the Direct Email printing method 206, users are assigned a unique email address. Documents sent to this unique email address would be printed by the receiving party's 232 printing mechanism 236. Receiving parties 232 can select which sending parties 230 may use this method via the Opt-Out mechanism described below.

With respect to the Shopping Cart Abandonment method 212, users of senders' 230 websites occasionally abandon shopping carts prior to their purchases being completed. In this case, sending parties 230 may print a document 240 to the receiving party's 232 printing mechanism 236. More specifically, the receiving party 232 will receive a list of the products left in the shopping cart and will send the corresponding receiving user's 232 a printable document 240 related to these items. Receivers 232 can select which senders 230 may use this method via the Opt-Out mechanism described below.

With respect to the P2P printing method 214, receivers 232 may choose to specify senders 230 that may print to their printing mechanism 236. For each sender 230, receivers 232 may choose whether or not the sender 230 is charged a distribution fee 244. Alternatively, receivers 232 may choose whether to forego the receipt of their print fee 244. Receivers 232 can select which senders 230 may use this method via the Opt-Out mechanism described below.

With respect to the API printing method 216, senders 230 may embed, in their existing computer programming infrastructure, commands to send documents to receivers' 232 printing mechanisms 236 based on criteria determined by said infrastructure. Commands may also be used to prompt receivers to open accounts.

With respect to the Search Sending method 208, the sending party 230 selects key search words that are relevant to their product or message, as well as potentially define a target demographic. When a receiving party 232 enters a search term which matches these key words, their personal data is referenced against the target demographic for the message. The target demographic is determined through the verified physical address 234. If the receiving party 232 satisfies the necessary requirements, the sending party's 230 printable document 240 is delivered and printed to the receiving party's 232 printing mechanism 236. After this process is confirmed by the automated printing mechanism 238, the sending party 230 is charged a distribution fee 242, and the receiving party 232 is credited a print fee 244 to recover the cost of printing the printable document 240.

In an alternative embodiment, multiple sending parties 230 can bid for the same keywords, demographics or combination thereof. Since a limited number of printable documents 240 will be delivered to each receiving party 232, sending parties 230 can bid up the price they are willing to pay for delivery of each printable document 240. In the preferred embodiment, pricing is for each printable document 240 sent to cost the sending party no less than $0.10, and each message received to pay no more than $0.06 to the receiving party 232. This ensures a positive profit margin and potentially greater profit margin for the system while giving the sending party 230 timely exposure to the receiving party 232 and giving the receiving party 232 a financial incentive to continue receiving such printable documents 240. Alternatively, the distribution fee 242 is calculated from the previous distribution fee, recent documents printed, total documents printed, total documents redeemed, activity period, and total bid requests.

In a further alternative embodiment, the receiving party 232 is given diminishing returns for each message received in a day. In the preferred embodiment, the standard rate of $0.06 will be credited to the receiving party 232 for each of the first six printable documents 240 delivered to their printing mechanism 236 in a day. The following six printable documents 240 will only credit $0.03 each, and no reimbursement is credited to the receiving party 232 for any printable documents 240 after the 12th for any calendar day. Since the receiving party 232 has the option to limit the total number of printable documents 240 received by their printing mechanism 236 in any day, any user can ensure that this system of diminishing returns does not eliminate the positive effect of the present system as a whole.

In still a further alternative embodiment, the receiving party 232 may establish automatic bill payments using the present invention. Here, the user will log onto the website and schedule bill payments, which include account information, due date, scheduled amount, scheduled date, delivery date, amount due, minimum payment due, and other relevant factors. When a bill is received and autopay is enacted, a message will be appended to the bill confirming the autopay setting applied to that bill. In the event that the sender 230 has a multiple page document (Example: statement), the sender 230 will have the option to send only one summary page, while providing a full statement on their website. For example, the footer of the first page of any document would include: "The remainder of your document is securely available at https://www.EmbracePaper.com/12345678."

In addition to the above specified embodiments, several additional features, limitations, and embodiments may be implemented. To ensure the present invention does not create an unwanted nuisance, the receiver 232 will have the ability to specify the dates and times which they are willing to accept printouts, or may define maximum page limits per day/period. Conversely, senders 230 will have the ability to specify when the receiver 232 will receive a printout for maximum effectiveness, so long as this time conforms to the receiver's 232 time periods as well.

For spam control, receivers 232 may employ an Opt-Out mechanism, where they elect to no longer receive printouts from specific senders. If a receiver 232 chooses less pages or opts out, the top bidders of the senders for each receiver would get the delivery. General mail delivery would wait till an available date if delivery is available. If any general mail delivery was delayed even one day, the user would be asked to receive those pages anyway at full $0.06 compensation. To combat abuse, payouts may be tiered by pages received, where receivers 232 who subscribe to printouts for profit receive lower payouts for increased volume of pages printed (Ex. 1-6 pages $0.06 per page, 7-12 pages $0.03 per page, 13+ pages $0.00 per page). Lastly, recipients could specify senders 230 that can send documents at no cost to sender, thereby not interfering with the gross profit model as most recipients would specify very few recipients in this category.

There will be instances where multiple recipients reside at the same physical address 234. To account for this, users must provide their name, physical address, names of other residents at their physical address, and names of any businesses at their physical address during account creation. This enables senders 230 with just the receiver's 232 physical address 234 and residents (people and businesses) to be sent documents 240 as well as comply with the sender's merge rules. For example, does sender 230 want to send a printout to each resident at the same address or just one per address. There will also be instances where multiple printers are located at the same physical address. Users may specify which residents' and/or businesses' documents will be delivered to which printer 236.

The above detailed description of the embodiments of the invention is not intended to be exhaustive or to limit the invention to the precise form disclosed above or to the particular field of usage mentioned in this disclosure. While specific embodiments of, and examples for, the invention are described above for illustrative purposes, various equivalent modifications are possible within the scope of the invention, as those skilled in the relevant art will recognize Also, the teachings of the invention provided herein can be applied to other systems, not necessarily the system described above. The elements and acts of the various embodiments described above can be combined to provide further embodiments.

Changes can be made to the invention in light of the above "Detailed Description." While the above description details certain embodiments of the invention and describes the best mode contemplated, no matter how detailed the above appears in text, the invention can be practiced in many ways. Therefore, implementation details may vary considerably while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated.

While certain aspects of the invention are presented below in certain claim forms, the inventor contemplates the various aspects of the invention in any number of claim forms. Accordingly, the inventor reserves the right to add additional claims after filing the application to pursue such additional claim forms for other aspects of the invention.

What is claimed is:

1. A processor-implemented method for document delivery, the method comprising:

receiving a physical address from a receiving party, said receiving party further comprising a client machine having a non-transitory storage medium, said client machine electronically connected to a printing mechanism;

verifying said physical address;

configuring an automatic printing mechanism once said physical address is verified, said automatic printing mechanism automatically print one or a plurality of printable documents through said printing mechanism;

receiving a printable document from a sending party without sending party interaction;

submitting said printable document to said automatic printing mechanism without receiving party interaction, said automatic printing mechanism further comprising a means for confirming that said printable document has been printed on said printing mechanism;

receiving a distribution fee from said sending party if said printable document is confirmed to be printed;

distributing a print fee to said receiving party if said printable document is confirmed to be printed, said print fee comprising a portion of said distribution fee; and storing said physical address, printable document, distribution fee, print fee, and confirmation on a non-transitory storage medium.

2. The method for document delivery of claim 1, wherein verifying said physical address further comprises: generating a plurality of personal questions from said receiving party's credit reports; generating a plurality of personal question answers to said personal questions from said receiving party's credit reports; sending said plurality of personal questions to said physical address; receiving answers to said personal questions from said receiving party; and comparing said answers to said personal question answers; wherein said physical address is verified if said answers are the same as said personal question answers.

3. The method for document delivery of claim 1, wherein verifying said physical address further comprises:

receiving a request to verify address;

generating a unique code corresponding to said physical address in response to said request;

sending said unique code to said physical address;
receiving a return code from said receiving party; and
comparing said unique code to said return code;
wherein said physical address is confirmed if said unique code is equal to said return code.

4. The method for document delivery of claim 1, further comprising:
sending a list of available printable documents to said receiving party; and
receiving a list of accepted printable documents from said receiving party, said list of accepted printable documents comprising a subset of said list of available printable documents;
wherein only said printable documents on said list of accepted printable documents will be submitted to said automatic printing mechanism.

5. The method for document delivery of claim 4, wherein said list of available printable documents further comprises:
assigning a monthly distribution fee to said receiving party, said receiving party further comprising a previous monthly distribution fee, recent documents printed, total documents printed, total documents redeemed, activity period, and total bid requests, said monthly distribution fee calculated from said previous monthly distribution fee, recent documents printed, total documents printed, total documents redeemed, activity period, and total bid requests;
receiving a bid value from a plurality of sending parties, said plurality of sending parties further comprising a plurality of printable documents; and
creating said list of available printable documents from a subset of said plurality of printable documents, said subset of said plurality of printable documents comprising printable documents who's received bid value from said sending party is equal to or greater than said monthly distribution fee.

6. The method for document delivery of claim 5, further comprising:
defining a printed threshold having a first printed threshold and one or a plurality of subsequent printed threshold values;
determining whether said recent printed documents meet or exceed said first or subsequent printed threshold values;
reducing said print fee once said first printed threshold value has been reached; and
further reducing said print fee once said subsequent printed thresholds are reached.

7. The method for document delivery of claim 5, further comprising:
defining a printed threshold having a first page threshold and one or a plurality of subsequent page threshold values;
determining whether said recent printed documents meet or exceed said first or subsequent page threshold values;
reducing said print fee once said first page threshold value has been reached; and
further reducing said print fee once said subsequent page thresholds are reached.

8. The method for document delivery of claim 5, further comprising:
receiving said activity period from said receiving party, said activity period further comprising dates and times which said receiving party will accept printable documents;
receiving a distribution time from said sending party;
calculating whether said distribution time is within said activity period; and
submitting said printable document to said automatic printing mechanism if said distribution time is within said activity period;
wherein said receiving party can limit when they will receive printable documents to prevent nuisance.

9. The method for document delivery of claim 1, further comprising:
sending a list of available sending parties to said receiving party; and
receiving a list of accepted sending parties from said receiving party, said list of accepted sending parties comprising a subset of said list of available sending parties;
wherein only said sending parties on said list of accepted sending parties will be able to submit printable documents to said automatic printing mechanism.

10. The method for document delivery of claim 1, further comprising:
electronically connecting a facsimile machine to said automatic printing mechanism;
configuring said automatic printing mechanism to automatically print one or a plurality of printable facsimile documents received from said facsimile machine on said printing mechanism;
receiving a printable facsimile document from said sending party without sending party interaction;
submitting said printable facsimile document to said facsimile machine without receiving party interaction, said automatic printing mechanism further comprising a means for confirming that said printable facsimile document has been printed on said printing mechanism;
receiving said distribution fee from said sending party if said printable facsimile document is confirmed to be printed; and
distributing said print fee to said receiving party if said printable facsimile document is confirmed to be printed;
wherein said receiving party will have an incentive to receive said printable facsimile documents through distribution of said print fee.

11. The method for document delivery of claim 1, further comprising:
generating a list of receiving parties comprising a plurality of receiving parties, a plurality of automatic printing mechanisms, and a plurality of printing mechanisms; and
submitting said printable document to said plurality of automatic printing mechanisms;
wherein said list of receiving parties is created from targeted contacts or targeted groups within social media websites.

12. The method for document delivery of claim 1, further comprising:
receiving a list of products from said receiving party which were viewed and/or purchased from a digital store;
submitting said list of products to said sending party; and
receiving one or a plurality of printable documents relating to one or a plurality of said list of products;
wherein said sending party can target receiving parties who have viewed and/or purchased related items.

13. The method for document delivery of claim 1, further comprising:
receiving a list of keywords from said receiving party which were searched;

submitting said list of keywords and physical address of said receiving party to said sending party; and receiving one or a plurality of printable documents relating to one or a plurality of said list of keywords and associated demographic information derived from said physical address;

wherein said sending party can target receiving parties who have searched certain keywords within a certain demographic, and wherein said receiving party will receive said print fee as an incentive for sending said list of keywords.

14. The method for document delivery of claim 1, further comprising:

receiving a list of approved senders comprising a subset of all sending parties; and foregoing receiving said distribution fee from said sending parties on said list of approved senders;

wherein said receiving parties may elect to receive said printable documents without charging said sending parties a distribution fee or without receiving a print fee.

15. The method for document delivery of claim 1, further comprising:

receiving a list of approved senders comprising a subset of all sending parties; and foregoing distributing said print fee to said receiving party if said printable document is confirmed to be printed;

wherein said receiving parties may elect to receive printable documents without receiving a fee.

16. A non-transitory computer-readable storage medium storing a set of instructions that, when executed by a processor, cause the processor to perform operations, comprising:

receiving a physical address from a receiving party, said receiving party further comprising a client machine having a non-transitory storage medium, said client machine electronically connected to a printing mechanism;

verifying said physical address;

configuring an automatic printing mechanism once said physical address is verified, said automatic printing mechanism automatically print one or a plurality of printable documents through said printing mechanism;

receiving a printable document from a sending party without sending party interaction;

submitting said printable document to said automatic printing mechanism without receiving party interaction, said automatic printing mechanism further comprising a means for confirming that said printable document has been printed on said printing mechanism;

receiving a distribution fee from said sending party if said printable document is confirmed to be printed;

distributing a print fee to said receiving party if said printable document is confirmed to be printed, said print fee comprising a portion of said distribution fee; and storing said physical address, printable document, distribution fee, print fee, and confirmation on a non-transitory storage medium.

17. A system for document delivery, the system comprising:

receiving a physical address from a receiving party, said receiving party further comprising a client machine having a non-transitory storage medium, said client machine electronically connected to a printing mechanism;

verifying said physical address;

configuring an automatic printing mechanism once said physical address is verified, said automatic printing mechanism automatically print one or a plurality of printable documents through said printing mechanism;

receiving a printable document from a sending party without sending party interaction;

submitting said printable document to said automatic printing mechanism without receiving party interaction, said automatic printing mechanism further comprising a means for confirming that said printable document has been printed on said printing mechanism;

receiving a distribution fee from said sending party if said printable document is confirmed to be printed;

distributing a print fee to said receiving party if said printable document is confirmed to be printed, said print fee comprising a portion of said distribution fee; and storing said physical address, printable document, distribution fee, print fee, and confirmation on a non-transitory storage medium.

* * * * *